United States Patent
Hsu

(10) Patent No.: US 8,018,470 B2
(45) Date of Patent: Sep. 13, 2011

(54) VECTOR BASED OBJECT PROPERTY VARIATIONS

(75) Inventor: Siu Chi Hsu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 11/277,754

(22) Filed: Mar. 28, 2006

(65) Prior Publication Data

US 2007/0229526 A1    Oct. 4, 2007

(51) Int. Cl.
*G09G 5/00*    (2006.01)

(52) U.S. Cl. ......... 345/619; 345/441; 345/581; 345/594

(58) Field of Classification Search .................. 345/418, 345/441, 442, 619, 620–689, 589, 581, 594, 345/592; 715/700, 764, 781, 835; 717/100, 717/106, 109, 810; 382/167, 283, 293, 321
See application file for complete search history.

(56) References Cited

U.S. PATENT DOCUMENTS

| | | | | |
|---|---|---|---|---|
| 5,182,548 A * | 1/1993 | Haeberli | ...................... | 345/639 |
| 5,222,207 A * | 6/1993 | Yamada | ...................... | 345/442 |
| 5,434,959 A * | 7/1995 | Von Ehr et al. | ............... | 345/441 |
| 5,455,599 A * | 10/1995 | Cabral et al. | .................. | 345/440 |
| 5,717,848 A * | 2/1998 | Watanabe et al. | ............. | 345/474 |
| 5,790,950 A * | 8/1998 | Suzuki et al. | ................. | 435/427 |
| 5,822,503 A * | 10/1998 | Gass et al. | ...................... | 358/1.9 |
| 5,835,086 A * | 11/1998 | Bradstreet et al. | ............ | 345/581 |
| 5,847,712 A * | 12/1998 | Salesin et al. | ................. | 345/582 |
| 5,986,665 A * | 11/1999 | Wrey et al. | ..................... | 345/581 |
| 6,057,854 A * | 5/2000 | Davis et al. | ..................... | 345/619 |
| 6,067,073 A * | 5/2000 | Rae-Smith et al. | ........... | 345/589 |
| 6,163,323 A * | 12/2000 | Intriligator | .................... | 345/473 |
| 6,226,015 B1 * | 5/2001 | Danneels et al. | ............. | 345/473 |
| 6,268,865 B1 * | 7/2001 | Daniels et al. | ................ | 345/582 |
| 6,310,622 B1 * | 10/2001 | Asente | .......................... | 345/441 |
| 6,329,990 B1 * | 12/2001 | Silverbrook et al. | ......... | 345/589 |
| 6,333,752 B1 * | 12/2001 | Hasegawa et al. | ............ | 715/764 |
| 6,373,490 B1 * | 4/2002 | Bendiksen et al. | ........... | 345/441 |
| 6,628,295 B2 * | 9/2003 | Wilensky | ....................... | 345/594 |
| 6,633,300 B1 * | 10/2003 | Tomack et al. | ................ | 345/581 |
| 6,774,907 B1 * | 8/2004 | Gupta | ............................ | 345/589 |
| 6,791,573 B2 * | 9/2004 | Hamburg | ....................... | 345/619 |
| 6,813,042 B2 * | 11/2004 | Hawksworth et al. | ......... | 358/1.9 |
| 6,870,550 B1 * | 3/2005 | Schuster et al. | .............. | 345/639 |
| 6,919,888 B1 * | 7/2005 | Perani et al. | ................... | 345/420 |
| 6,970,169 B1 * | 11/2005 | Harris | ............................ | 345/440 |
| 6,975,332 B2 * | 12/2005 | Arnold et al. | ................. | 345/611 |
| 7,061,501 B1 * | 6/2006 | Lake et al. | ..................... | 345/582 |
| 7,817,159 B2 * | 10/2010 | Schuster et al. | .............. | 345/582 |
| 2002/0085003 A1 * | 7/2002 | Nagashima | .................... | 345/441 |
| 2002/0130908 A1 * | 9/2002 | Wilensky | ....................... | 345/863 |
| 2003/0107558 A1 * | 6/2003 | Bryborn et al. | ................ | 345/179 |
| 2004/0196295 A1 * | 10/2004 | Derry et al. | .................... | 345/594 |
| 2004/0263537 A1 * | 12/2004 | Faraday et al. | ............... | 345/660 |
| 2006/0001932 A1 * | 1/2006 | Sekiguchi | ...................... | 358/537 |

* cited by examiner

*Primary Examiner* — Andrew Wang
*Assistant Examiner* — Abderrahim Merouan

(57) ABSTRACT

An electronic vector based graphics design application may automatically introduce a variation to a property of a vector based graphic object, existing ones or those to be created using one of the vector object creation tools, by specifying a variation through any suitable set of one or more user interfaces. The variation targeted against one or more properties in the attributes may be defined by one or more variation parameters including any combination of range, percentage, randomness, category of values, and the like. Such targeted properties may be varied based on the variation parameters in any suitable manner, such as randomly, sequentially or other deterministic way. The variation of the property value(s) may be applied to the vector object as it is generated by a vector object creation tool, or may be applied to one or more existing vector objects post-generation.

18 Claims, 11 Drawing Sheets

| Vector object identifier 1002 | Coordinate frame 1004 | Attributes 1006 | Filter(s) 1008 | Deformation Data 1010 |

FIG. 10

VECTOR BASED OBJECT PROPERTY VARIATIONS

BACKGROUND

Producers of graphic content for display using an electronic graphics design application want to create rich graphic contents which can be manipulated for different uses. Graphic content can take the form of a collection of analytical graphic objects, often referred to as "vector objects", in a vector document. A vector object is an abstract graphic entity such that its appearance, position, and orientation in the picture space are described analytically through geometrical formulae and other attribute information (e.g., color, gradient, fill type, stroke type, stroke width and the like).

Many electronic graphics design applications allow a user to create vector graphic objects using various vector object creation tools which may include a freehand pen tool, a Bezier pen tool, a rectangle tool, curve creation tools and the like. The attributes of the vector graphic objects created by such tools may take up a set of attributes set up by the user before using the creation tools. The attributes of graphic objects may also be modified subsequent to the initial rendering of the vector object, typically through individually manipulating each property value through a user interface device such as a menu and/or dialog box.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Creating a graphics design with an electronic vector based graphics design application may require the creation of graphic objects of different attributes, such as fill type, fill color, stroke type, stroke thickness, transparency, etc. In order to create designs with a less mechanical appearance, it is often desirable to introduce subtle variations to the appearance of multiple graphic objects in a particular design. It is possible to manually adjust the attributes before or after the creation of the graphic objects to introduce such variation. It is potentially a tedious process, especially if there are many graphic objects with many properties involved in a particular design, or if the artist would like to alter the nature or amount of variations subsequently.

Variations to properties of vector based graphics may be automatically introduced to graphic objects, existing ones or those to be created using one of the vector object creation tools, by specifying a set of variation attributes (or simply 'variations') through any suitable set of one or more user interfaces. Such variations may be stored associated with the set of attributes they set out to perturb or may be incorporated within the perturbed attributes.

The attributes of a graphic object to be varied may be any suitable set of properties. The variation targeted against one or more properties in the attributes may be defined by one or more variation parameters including any combination of user defined range, percentage, randomness, category of values, and the like. Such targeted properties may be varied based on the variation parameters in any suitable manner, such as randomly, sequentially or other deterministic way.

The variation of the property value(s) may be applied to the vector object as it is generated (e.g., drawn) by a vector object creation tool, or may be applied to one or more existing vector objects post-generation. The variation parameters may be predefined before the creation of vector objects and associated with a vector object creation tool and/or modified in one or more existing vector objects post-generation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 10 is a table of an example vector object data store; and

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a graphics design system, the system described is provided as an example and not a limitation. As those skilled in the art will appreciate, the present examples are suitable for application in a variety of different types of object editing systems.

Figure 1:
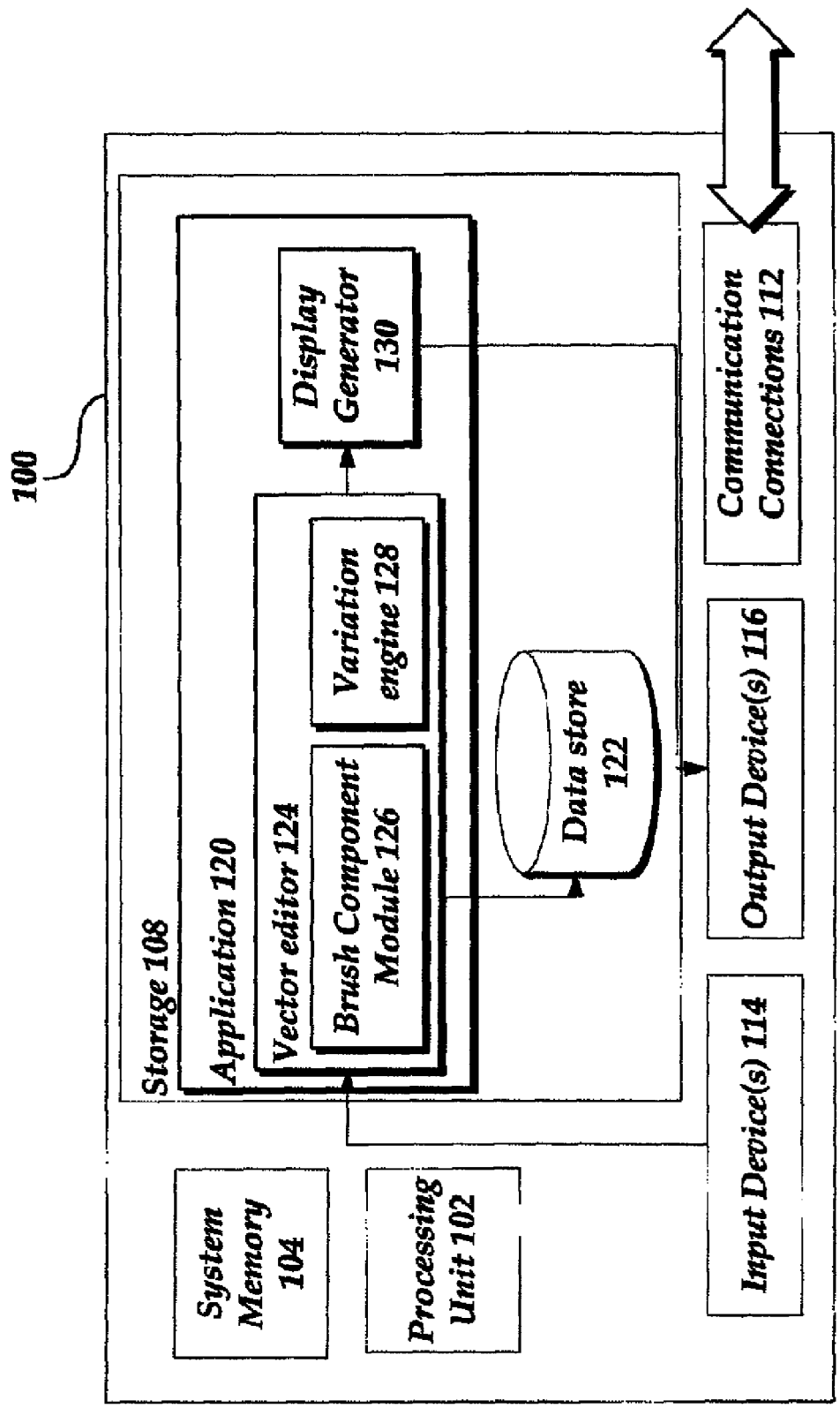
FIG. 1 is a block diagram of an example computing system for a graphics design system.

FIG. 1 and the following discussion are intended to provide a brief, general description of a graphics design system 100. As shown in FIG. 1, a graphics design system 100 may be provided by one or more computing devices 106. Computing device 106 of FIG. 1 and the following discussion are intended to provide a brief, general description of a suitable computing environment in which all or a portion of a graphics design system may be implemented. The operating environment of the computing device 106 of FIG. 1 is only one example of a suitable operating environment and is not intended to suggest any limitation as to the scope of use or functionality of the operating environment. Other well known computing systems, environments, and/or configurations that may be suitable for use with a graphics design system 100 described herein, include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

In its most basic configuration, computing device 106 typically includes at least one processing unit 102 and memory 104. Depending on the exact configuration and type of computing device, memory 104 may be volatile (such as RAM), non-volatile (such as ROM, flash memory, etc.) or some combination of the two.

Additionally, device 106 may also have additional features and/or functionality. For example, device 106 may also include additional storage 108 (e.g., removable and/or non-removable). Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 106. Any such computer storage media may be part of memory 104 and/or storage 108.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 106 may contain one or more communication connection(s) 112 that allow the device 106 to communicate with other devices, such as with other computing devices through a network (not shown). Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 106 may have one or more input device(s) 114 such as keyboard, mouse, pen, stylus, voice input device, touch input device, laser range finder, infra-red cameras, video input devices, and/or any other input device. Output device(s) 116 such as one or more displays, speakers, printers, and/or any other output device may be included.

Although not required, the graphics design system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

The computing device 106 of the graphics design system may include one or more modules stored in any suitable manner, such as in the memory 104 and/or in the storage 108. As shown in the example of FIG. 1, the storage 108 may contain (or contain a reference to) modules for implementing the graphics design system such as a graphics design application 120 and a data store 122.

In the example of FIG. 1, the graphics design system may provide a vector editor 124, tool module 126, variation engine 128, and display generator 130. Although separate components are provided for the vector editor, tool module, variation engine, and display engine, it is to be appreciated that the graphics design application may provide any number of components in any format to provide the functionality discussed herein.

The vector editor 124 provides an environment for manipulation of one or more vector graphic objects. For example, the vector editor may provide a manipulation frame framing a workspace. The vector editor 124 may communicate the environment information to the display generator 130 to be displayed to the user through the output device 116, and to accept input for object manipulation from the user through the input device 114. For example with reference to the example display 400 of FIG. 4, the vector editor 124 may provide a frame 402 with a workspace 404 for creation and/or modification (i.e., manipulation) of vector based objects.

To allow manipulation (e.g., creation and/or modification) of vector based objects in the graphics design application, the vector editor 124 through the tool module 126 may provide one or more tools such by displaying a tool box, tool bar, menu, palette, and the like through the display generator 130. For example, in the example display 400 of FIG. 4, the vector editor provides through the display generator a vector tool box 406 containing one or more tools for manipulating vector objects. Any number and kind of tools and/or functionalities may be provided to manipulate vector based objects.

To generate a vector object, the tool module may provide any number of vector object creation tools such as a Bezier tool, spline tool, shape tool, and the like. Example selectable icons are shown in the toolbox 406 of FIG. 4 as Bezier tool 408, spline tool 410, and shape tool 412. The Bezier tool 408 may allow a user to draw a Bezier path based on input device potions or events. The spline tool 410 may allow a user to draw a B-spline path, which may provide some functionality over a Bezier path. The spline tool may be used to click for a location of a control point, but based on the B-spline vector algorithm, the resulting curve may or may not pass through the node. The shape tool 412 may be used to create one or more shapes such as ellipses, rectangles, stars, lines, spirals, and the like.

Since a vector based graphic object is described analytically through geometrical formulae and other attribute information, manipulating a vector graphic object using one or more tools may manipulate one or more values of the attributes or properties of the vector based graphic object. Any number and type of properties may be used to define the vector based graphic object including stroke or brush type, stroke/fill color, stroke/fill pattern, stroke width, stroke/fill opacity, vector object creation tool shape, and the like.

Figure 4:
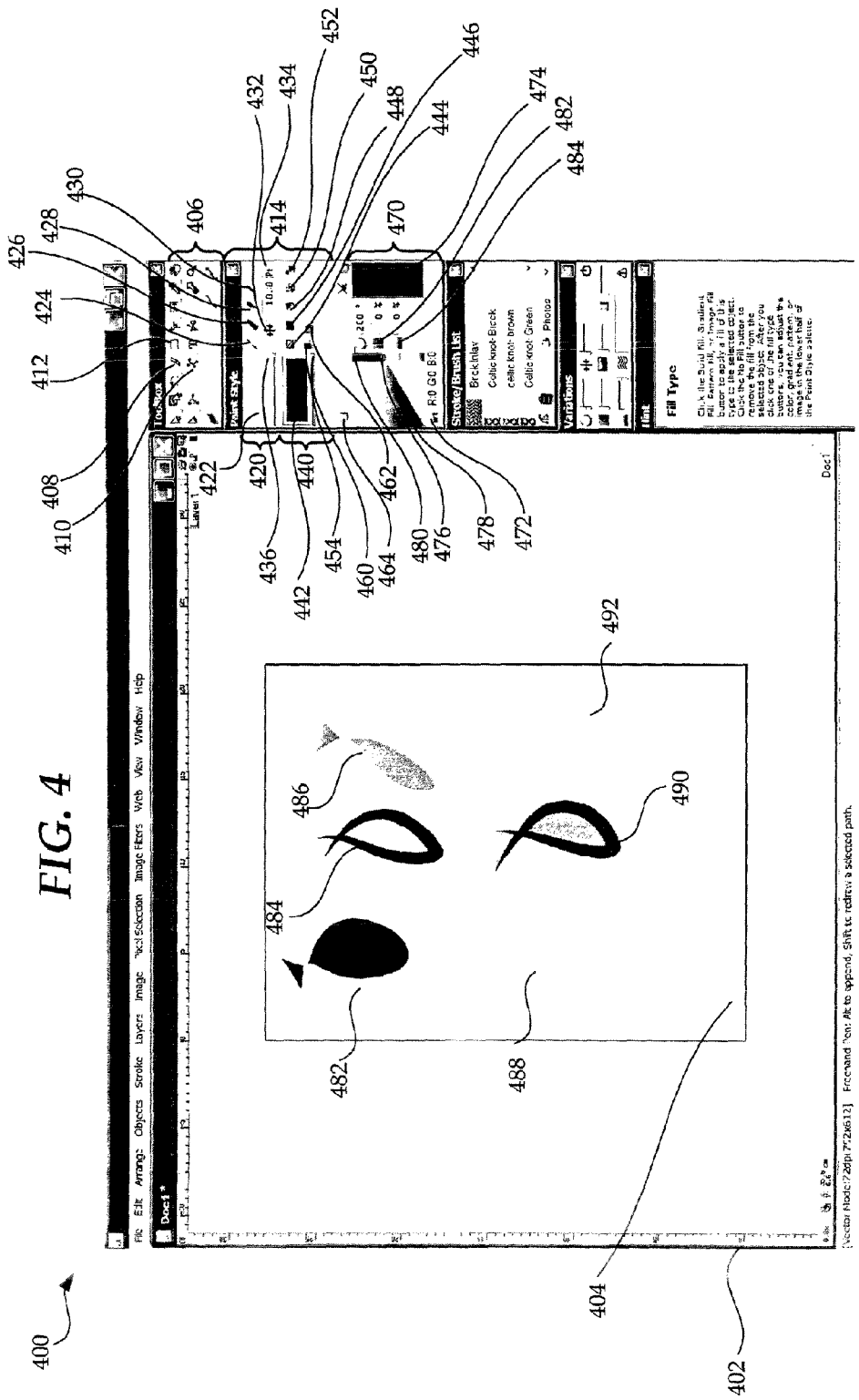
FIG. 4 is an example display of a vector graphics application and stroke and fill type variations.

The one or more properties of a vector based object may be modified by a user in any suitable manner, such as through one or more menu options, tool box operations, a dialogue box, and the like. An example vector object property box 414 is shown in FIG. 4. The vector object property box 414 displays various properties associated with the vector object stroke in stroke property toolbox 420, properties associated with the vector object fill in fill property toolbox 440, and color properties in the color palette 470 that are associated with a stroke and/or fill property. It is to be appreciated that although the vector object property box displays various properties sorted into stroke, fill, and color, it is to be appreciated that any type and/or combination of user interface device(s) such as dialogue box(es), menus, and the like in any arrangement and form may be used.

The stroke property toolbox may include any one or more user devices of any type and format, to allow a user to modify any one or more properties of the stroke of the vector object. For example, the stroke property toolbox 420 of FIG. 4 includes an example stroke display 422, a no stroke selector 424, a basic stroke selector 426, a gradient stroke selector 428, a skeletal stroke selector 430, a stroke width selector 434, and a stroke opacity slider 436. It is to be appreciated that other or any combination of stroke property values and/or selectors may be displayed and/or modified. The example stroke display 422 displays an example stroke based on selected properties for the current stroke and based upon a default pen down, movement and pen up event. The stroke opacity slider 436 allows a user to adjust the opacity of the entire stroke with a slider user device where the full range to the right indicates full opacity and the range to the left indicates full transparency. The stroke width selector 434 allows a user to define the width of the entire stroke. As shown in FIG. 4, the stroke width selector is a text input box that defines the stroke width in points and also allows a user to 'dial' the width up and down with a selector wheel or other device of an input device. The no stroke selector 424 removes the stroke (or outline) of the manipulated vector object (e.g., a new vector object created with the tool set to no stroke, or a selected vector object when the no stroke tool is selected). The basic stroke selector 426 allows a basic rectangular stroke to be applied or any other default stroke shape. The gradient stroke selector 428 is similar in shape to the basic stroke type, but allows a gradient color to be applied to the stroke. The skeletal stroke selector 430 allows a pattern to be repeated or stretched along the length of the indicated stroke. The stroke selectors 424, 426, 428, 430 are each illustrated as selectable buttons, where the selection of one stroke type automatically de-selects another selected stroke type. It is to be appreciated that the display user interface device(s) to select stroke properties (e.g., stroke types, stroke display, stroke width, stroke opacity, and any other stroke property) may be any suitable user interface device or combination of user interface devices such as drop down menu, text box, buttons, and the like.

The fill property toolbox may include any one or more user devices of any type and format, to allow a user to modify any one or more properties of the fill of the vector object. For example, the fill property toolbox 440 of FIG. 4 includes an example fill preview 442, no fill selector 444, solid fill selector 446, gradient fill selector 448, pattern fill selector 450, image fill selector 452, and fill transparency slider 454. It is to be appreciated that other or any combination of fill property values and/or selectors may be displayed and/or modified. The example fill preview 442 displays an example fill based on selected properties for the current fill and based upon a default area which in FIG. 4 is a rectangle. The fill opacity slider 442 allows a user to adjust the opacity of the fill with a slider user device where the full range to the right indicates full opacity and the range to the left indicates full transparency. The no fill selector 444 removes the fill of the manipulated vector object (e.g., a new vector object created with the tool set to no stroke, or a selected vector object when the no stroke tool is selected). The solid fill selector 446 allows a solid color and pattern fill to be applied. The gradient fill selector 448 is similar in shape to the basic stroke type, but allows a gradient color to be applied to the fill. The pattern fill selector 450 allows a pattern to be repeated or stretched within the area of the indicated stroke trail. The image fill selector 452 fills the open areas of the vector based object with a default and/or user indicated image or portion of an image. The fill selectors 444, 446, 448, 450 are each illustrated as selectable buttons, where the selection of one fill type automatically de-selects another selected fill type. It is to be appreciated that the user interface device to select fill properties (e.g., fill types, fill preview, fill opacity, and any other fill property) may be any suitable user interface device or any combination of user interface devices such as drop down menu, text box, buttons, and the like.

The color palette may include any one or more user devices of any type and form to allow a user to modify any one or more properties of the color of the vector object, such as the stroke and/or fill (either together or separately). For example, the color palette 470 of FIG. 4 includes an example color picker 472, color preview 474, color bar 476, color triangle 478, hue meter 480, saturation meter 482, and lightness meter 484. It is to be appreciated that other or any combination of color property values and/or selectors may be displayed and/or modified. The example color preview 474 displays an example color based on selected properties for the current color and within a default area which in FIG. 4 is a rectangle. The color picker 472 allows a user to define the color model used in the color palette. For example, any number and type of color models may be presented, such as hue-saturation-lightness (HSL), red-green-blue (RGB), cyan-magenta-yellow-black (CMYK), custom color models, and the like. The example color palette 470 of FIG. 4 illustrates interface devices to adjust one or more properties within an HSL color model. To modify the selected color, a hue may be chosen through the color bar 476. Specifically, a point on the color bar displaying the color spectrum may be selected to indicate the desired hue. Although a color bar with a movable indicator is shown in FIG. 4, it is to be appreciated that any hue selector may be appropriate such as a draggable color wheel, text box(es) to input specific hue colors, and the like. The selected hue with varying lightness and/or saturation may be displayed in a color triangle, such as color triangle 478. The color triangle 478 shows the hue with no saturation or lightness at the far right, increasing saturation towards the bottom left of the color triangle, and increasing lightness towards the upper left of the color triangle. The lightness and saturation of the indicated hue may be selected by selecting the desired color within the displayed color triangle. In response to a selected change in hue, lightness, saturation, and the like, the color preview may be automatically updated to illustrate the currently selected color. Additionally, the stroke preview and/or fill preview may be automatically updated to indicate changes in color to that property. The color may be additionally or alternatively modified with one or more property selectors, such as the hue meter 480, saturation meter 482, and lightness meter 484, where a user may numerically indicate the property value for the desired color through a text box. Although various color properties and selectors are illustrated in FIG. 4, it is to be appreciated that the user interface device to select color properties may be any suitable user interface device such as drop down menu, text box, buttons, and the like. It is also to be appreciated that although FIG. 4 illustrates color properties relevant to an HSL color model, the modifiable property values and associated user interface devices may change in response to a change in the color model. For example, in an RGB color model, the modifiable color properties may include red, green, and blue sliders, meters, and the like; in a CMYK color model, the modifiable color properties may include cyan, magenta, yellow and black sliders, meters, and the like; and any other color mode such as one defined by a user and the like.

The stroke property tool box, fill property toolbox, color palette, and/or any other user interface device may include additional and/or alternative user devices to display to a user and/or allow a user to modify one or more object properties such as object edge properties, digital surface features, etc. For example, the fill property tool box 440 of FIG. 4 includes a soft edge selector 460, an embossed edge selector 462, and a paper texture selector 464. When activated, the soft edge selector may create a reducing opacity at the outside edge(s) of the selected or drawn object. The embossed edge selector 462 may create an effect of an embossed edge to a filled object. The paper texture selector 464 may modify the 'paint' applied to the digital surface by applying a texture to the 'surface'. For example, the paper texture may be any suitable texture such as brick, sandpaper, and the like. The soft edge selector 460, the embossed edge selector 462, and paper texture selector 464 are each displayed as a button, but may be any type and/or combination of suitable user interface device(s). Selection of the soft edge and/or embossed edge selectors may trigger the graphics design application to display an edge meter (not shown) which allows a user to indicate the width, such as in pixels, of the edge to be applied to the selected object.

For a user to vary one or more properties of a vector based object, a user may manually modify the one or more property values using the user devices discussed above or any other user device. However, manually modifying each property value for each vector object may be a potentially a tedious process, especially if there are many graphic objects with many properties involved in a particular design, or if the artist would like to alter the nature or amount of variations subsequent to generation of the vector objects.

Variations to properties of vector based graphics may be automatically introduced to graphic objects by the graphics design application by specifying a set of variation attributes (or simply 'variations'). Specifically, the graphics design application may automatically introduce a variation of the property value as compared to a default or basis property value. In this manner, each vector object may have a property value that is varied from the basis value, and thus may be different from each other without the user manually changing that property value. For example, the opacity property may be varied for a brush component. In a first example, each vector object created with that brush component may have that property varied in a predetermined or user identified manner over the entire trail of the stroke. Specifically, a first stroke created by the brush component may have a first opacity and a second stroke created by the same brush component may have a second opacity that is different from the first opacity, where either or both of the first and second opacities is automatically varied by the graphics design application.

The variation of the property may be indicated by and displayed to the user in any suitable manner. For example, the graphics design application, such as graphics design application 120 of FIG. 1, may provide one or more variation property selectors through the brush component module 126 to be displayed to the user through the display generator 130. The user may indicate one or more properties to be varied, such as through selecting one or more selectors with an input device 114. In response to receiving an indication of the variation selection and an indication of a brush stroke (e.g., through a user input of a stroke with a pen down and movement of the input device 114 and/or through selection of one or more existing vector objects with the input device 114), the brush component module may automatically access the variation engine 128 to determine the appropriate variation property value associated with the indicated selection and apply that property value variation to the vector object.

The variation of a property may be determined in any suitable manner by the variation engine 128. For example, one or more variation parameters may be determined such as by retrieving default or predetermined variation parameters from memory and/or storage, and/or receiving user defined variation parameters. The variation parameters may define limits and/or types of variations to be applied to the property. For example, the type of variation applied by the variation engine may be a random selection of a variation, a sequential selection of a variation (e.g., step increment/decrement, ordered selection from a group, etc.), or in any other deterministic manner. The selection of a variation may be limited by any combination of a range, percentage, randomness, category or group of values, and the like and may be defined by the variation parameters. For example, a user may define a random variation within a specified percentage of a basis property value. The basis property value may be any suitable value such as a default value or a user defined basis value. In one example, the basis property value may be a variation parameter defined by the user or by a default value. In another example, the basis property value may be the property value as defined by the user for a selected vector object creation tool and the determined variation may be applied (e.g., added, subtracted, multiplied, etc.) to the basis property value to determine the varied property value to be applied to the particular stroke. In one example, the variation may be a random selection within a defined percentage range as defined by a variation delimiter. For a random type variation, the variation engine may determine a random number between negative one and positive one and multiply that determined random number with the defined maximum percentage of variation. This resulting value may be added to the basis property value to determine the automatically and randomly varied property value. The random number may be generated in any suitable manner, such as using a random number generator like a multiplicative random generator, a Knuth subtractive method, etc.

The attributes of a graphic object to be varied may be any property associated with a vector based object including stroke type, stroke/fill color, stroke/fill pattern, stroke width, stroke/fill opacity, vector object shape (e.g., ellipse, rectangle, star, spiral, etc.), object edge type, paper texture, etc. In the examples below, stroke and fill color (as defined within a particular color model such as hue, saturation, lightness), stroke and fill opacity, stroke width, stroke width variability, stroke type, and the like, are described, however, it is to be appreciated that any attribute of a vector object may be automatically varied in a similar or suitable manner.

The set of one or more variations as defined by the one or more variation parameters may be specified through any suitable set of one or more user interfaces. For example, the variation parameters may include a property indicator indicating the property to be varied and a variation delimiter indicating the type and/or limits on the variation.

The variation parameters may be provided to the variation engine by the user input device in any suitable manner. For example, the user and/or graphics application may provide a set of stored default values to be applied when a variation is indicated. Additionally or alternatively, the graphics design application may provide one or more user variation property selectors through one or more user interface devices allowing a user to select and define the variation parameters for a vector object. The variation property selectors may be any suitable user interface devices and may be displayed to the user in any suitable manner, such as through drop down menus, pop-up menus, buttons, and the like. In one example, the variation property selectors may be displayed to the user in a variation toolbox.

Figure 2:
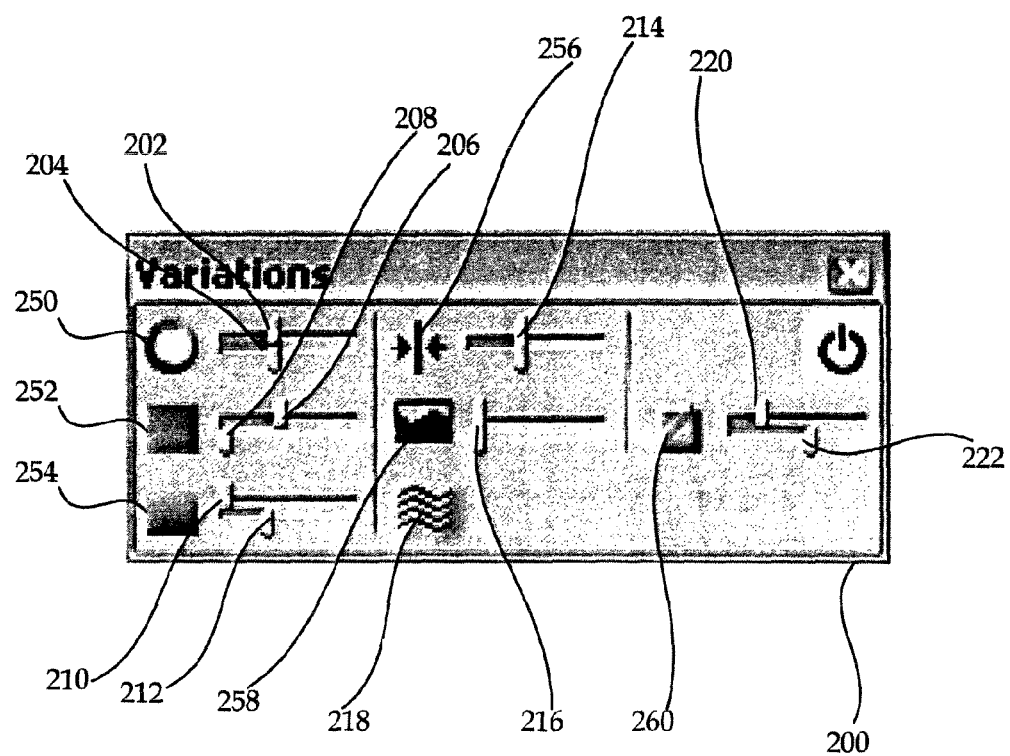
FIG. 2 is an example display of a property variation toolbox.

FIG. 2 illustrates an example display of a variation toolbox 200 of user interface devices for defining variation parameters of a vector object. For example, the variation property selector may provide a stroke hue variation selector 202, a fill hue variation selector 204, a stroke saturation variation selector 206, a fill saturation variation selector 208, a stroke lightness variation selector 210, a fill lightness variation selector 212, a stroke width variation selector 214, a variable stroke width variation selector 216, a brush type variation selector 218, a stroke opacity variation selector 220, and a fill opacity variation selector 222. Although the properties of the variation toolbox 200 of FIG. 2 are relevant to vector object defined within an HSL color model, the variation properties and associated user interface devices may automatically change in response to a change in the color model or any other property which defines properties of a vector object. It is to be appreciated that any attribute of a vector object may be varied in addition to and/or alternative to the vector object properties discussed in the example variation toolbox 200.

The stroke hue variation selector 202 may indicate to the graphics design application that the variation parameter (e.g., property indicator) is the hue or color of the stroke which is to be automatically varied for each stroke indicated (e.g., created by a vector object creation tool and/or one or more selected vector objects post generation). The variation parameter of the variation delimiter associated with the stroke hue property indicator may be provided in any suitable manner such as provided by the user and/or retrieved from memory and/or storage. For example, a user may define the variation delimiter for the stroke hue variation selector in terms of a maximum percentage of variability (i.e., an upper boundary of a range as a percentage of the color wheel range available for selection) based on a basis selected stroke hue in the color palette for the associated vector object creation tool. The example stroke hue variation selector 202 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's stroke hue may be from the basis hue.

In response to the stroke hue variation selector being activated (e.g., slid to indicate a variability of greater than 0%) and an indication of a stroke from the user, the variation engine may automatically determine the variation value appropriate hue for each indicated stroke based on the predetermined or user defined variation parameters. The variation to the property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis hue property value to determine the varied property value of the indicated stroke. This process may be repeated for each indicated stroke. As a result, each stroke may have a slightly different hue but within the range as defined by the variation delimiter.

In a specific example, the vector objects 482, 484, 486, 488, 490, 492 of the example display of FIG. 4 may be drawn with a single brush tool with the stroke hue variation selector activated and the hue delimiter indicating a variation of 100% and the basis color having a non-zero lightness and a non-zero saturation. Although color is not apparent in the vector objects of FIG. 4, the color of the stroke of vector object 490 may have a blue hue and the stroke of vector object 482 may have a green hue, etc. In response to each drawn trail indicated by a brush stroke with the brush tool, the hue of each stroke is automatically determined based on the variation parameters (e.g., variation percentage) and the basis hue of the vector object creation tool. In this manner, the hue of the stroke of each object may differ from the stroke of a previous object without the user having to change the stroke hue property each time a stroke is drawn.

In a similar manner, the fill hue variation selector 204 may indicate to the graphics design application that the variation parameter (e.g., property indicator) includes the hue or color of the fill which is to be automatically varied for each stroke indicated (e.g., created by a vector object creation tool and/or one or more selected vector objects post generation). The variation delimiter of the variation parameters associated with the fill hue property indicator may be provided in any suitable manner such as provided by the user and/or retrieved from memory and/or storage. For example, a user may define the variation delimiter for the fill hue variation selector in terms of percentage of variability (i.e., percentage of the color wheel range available for selection) based on a basis selected fill hue in the color palette for the associated vector object creation tool. The example fill hue variation selector 204 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's fill hue may be from the basis hue.

As shown in the example variation toolbox of FIG. 2, the stroke hue selector 202 and the fill hue selector 204 may be displayed proximate each other. The property, e.g., hue, may be indicated to the user with a color property indicator 250, which is shown as a color wheel. Proximate placement of the stroke hue selector and the fill hue selector to a single color property indicator may provide a compact display of tools for the user. Moreover, a user may be provided with controls which allow the stroke hue selector to be independently moved relative to the fill hue selector. Additionally or alternatively, the user may be provided with a user interface device which allows both the stroke and fill hue selector to be moved together if the user wishes for both properties (e.g., stroke and fill) to be varied identically. For example, a single click and drag may move a single selector, and a double click and drag may move both selectors, even if only one selector is beneath the user input device indicator (e.g., mouse icon, stylus, etc.).

Although the sliders of the stroke hue selector and the fill hue selector are displayed as horizontal with the stroke selector on top, it is to be appreciated that any user interface device(s) in any appropriate orientation may be used.

In response to the fill hue variation selector being activated (e.g., slid to indicate a variability of greater than 0%) and an indication of a stroke from the user, the variation engine may automatically determine the variation value appropriate hue for each indicated stroke based on the predetermined or user defined variation parameters. The variation to the property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis fill hue property value to determine the varied property value of the indicated stroke. This process may be repeated for each indicated stroke. As a result, each fill of each vector object may have a slightly different hue but within the range as defined by the variation delimiter.

In a specific example, the vector objects 482, 484, 486, 488, 490, 492 of the example display of FIG. 4 may be drawn with a single brush creation tool with the fill hue variation selector activated, the hue delimiter indicating a variation of 100% for that tool, and a non-zero value for lightness and a non-zero value for saturation. Although color is not apparent in the vector objects of FIG. 4, the color of the fill of vector object 488 may have a yellow hue and the fill of vector object 482 may have a blue hue, etc. In response to each drawn trail indicated by a brush stroke with the brush tool, the hue of each fill is automatically determined based on the variation parameters (e.g., variation percentage) and the basis hue of the vector object creation tool. In this manner, the hue of the fill of each object may differ from the stroke of a previous object without the user having to change the fill hue property each time a stroke is drawn.

The stroke saturation variation selector 206 may indicate to the graphics design application that the variation parameter (e.g., property indicator) is the saturation of the color of the stroke which is to be automatically varied for each stroke indicated (e.g., created by a vector object creation tool and/or one or more selected vector objects post generation). The variation parameter of the variation delimiter associated with the stroke saturation property indicator may be provided in any suitable manner such as provided by the user and/or retrieved from memory and/or storage. For example, a user may define the variation delimiter for the stroke saturation variation selector in terms of percentage of variability based on a basis selected stroke saturation in the color palette for the associated vector object creation tool. The example stroke saturation variation selector 206 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's stroke saturation may be from the basis saturation.

In response to the stroke saturation variation selector being activated (e.g., slid to indicate a variability of greater than 0%) and an indication of a stroke from the user, the variation engine may automatically determine the variation value appropriate saturation for each indicated stroke based on the predetermined or user defined variation parameters. The variation to the stroke saturation property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis saturation property value to determine the varied property value of the indicated stroke. This process may be repeated for each indicated stroke. As a result, each stroke may have a slightly different saturation but within the range as defined by the variation delimiter.

In a similar manner, the fill saturation variation selector 208 may indicate to the graphics design application that the variation parameter (e.g., property indicator) is the saturation of the color of the fill which is to be automatically varied for each vector object indicated (e.g., created by a vector object creation tool and/or one or more selected vector objects post generation). The variation parameter of the variation delimiter associated with the fill saturation property indicator may be provided in any suitable manner such as provided by the user and/or retrieved from memory and/or storage. For example, a user may define the variation delimiter for the fill saturation variation selector in terms of a maximum percentage of variability based on a basis selected fill saturation in the color palette for the associated vector object creation tool. The example fill saturation variation selector 208 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's fill saturation may be from the basis fill saturation.

As shown in the example variation toolbox of FIG. 2, the stroke saturation selector 206 and the fill saturation selector 208 may be displayed proximate each other. The general property, e.g., color saturation, may be indicated to the user with a saturation property indicator 252, which is shown as gradient block. Proximate placement of the stroke saturation selector and the fill saturation selector to a single saturation property indicator may provide a compact display of tools for the user. Moreover, a user may be provided with controls which allow the stroke saturation selector to be independently moved relative to the fill saturation selector. Additionally or alternatively, the user may be provided with a user interface device which allows both the stroke and fill saturation selectors to be moved together if the user wishes for both properties to be varied identically. For example, a single click and drag may move a single selector, and a double click and drag may move both selectors, even if only one selector is beneath the user input device indicator (e.g., mouse icon, stylus, etc.). Although the sliders of the stroke saturation selector and the fill saturation selector are displayed as horizontal with the stroke selector on top, it is to be appreciated that any user interface device(s) in any appropriate orientation may be used.

In response to the fill saturation variation selector being activated (e.g., slid to indicate a variability of greater than 0%) and an indication of a stroke from the user, the variation engine may automatically determine the variation value appropriate saturation for each indicated vector object based on the predetermined or user defined variation parameters. The variation to the fill saturation property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) o the basis fill saturation property value to determine the varied fill property value of the indicated stroke. This process may be repeated for each indicated vector object. As a result, each vector object may have a slightly different fill saturation but within the range as defined by the variation delimiter.

The stroke lightness variation selector 210 may indicate to the graphics design application that the variation parameter (e.g., property indicator) is the lightness of the color of the stroke which is to be automatically varied for each vector object indicated (e.g., created by a vector object creation tool and/or one or more selected vector objects post generation). The variation parameter of the variation delimiter associated with the stroke lightness property indicator may be provided in any suitable manner such as provided by the user and/or retrieved from memory and/or storage. For example, a user may define the variation delimiter for the stroke lightness variation selector in terms of a maximum percentage of variability based on a selected basis stroke lightness indicated in the color palette for the associated brush component. The example stroke lightness variation selector 210 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's stroke lightness may be from the basis stroke lightness.

In response to the stroke lightness variation selector being activated (e.g., slid to indicate a variability of greater than 0%) and an indication of a stroke from the user, the variation engine may automatically determine the variation value appropriate lightness for each indicated stroke based on the predetermined or user defined variation parameters. The variation to the stroke lightness property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis lightness property value to determine the varied property value of the indicated stroke. This process may be repeated for each indicated vector object. As a result, each stroke may have a slightly different lightness but within the range as defined by the variation delimiter.

In a similar manner, the fill lightness variation selector 212 may indicate to the graphics design application that the variation parameter (e.g., property indicator) is the lightness of the color of the fill which is to be automatically varied for each vector object indicated (e.g., created by a vector object creation tool and/or one or more selected vector objects post generation). The variation parameter of the variation delimiter associated with the fill lightness property indicator may be provided in any suitable manner such as provided by the user and/or retrieved from memory and/or storage. For example, a user may define the variation delimiter for the fill lightness variation selector in terms of a maximum percentage of variability based on a selected basis fill lightness in the color palette for the associated vector object creation tool. The example fill lightness variation selector 212 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's fill lightness may be from the basis fill lightness.

As shown in the example variation toolbox of FIG. 2, the stroke lightness selector 210 and the fill lightness selector 212 may be displayed proximate each other. The general property, e.g., lightness, may be indicated to the user with a lightness property indicator 254, which is shown as gradient block of white to black. Proximate placement of the stroke lightness selector and the fill lightness selector to a single lightness property indicator may provide a compact display of tools for the user. Moreover, a user may be provided with controls which allow the stroke lightness selector to be independently moved relative to the fill lightness selector.

Additionally or alternatively, the user may be provided with a user interface device which allows both the stroke and fill lightness selectors to be moved together if the user wishes for both properties to be varied identically. For example, a single click and drag may move a single selector, and a double click and drag may move both selectors, even if only one selector is beneath the user input device indicator (e.g., mouse icon, stylus, etc.). Although the sliders of the stroke lightness selector and the fill lightness selector are displayed as horizontal with the stroke selector on top, it is to be appreciated that any user interface device(s) in any appropriate orientation may be used.

In response to the fill lightness variation selector being activated (e.g., slid to indicate a variability of greater than 0%) and an indication of a stroke from the user, the variation engine may automatically determine the variation value appropriate saturation for each indicated vector object based on the predetermined or user defined variation parameters. The variation to the fill lightness property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis fill lightness property value to determine the varied fill property value of the indicated stroke. This process may be repeated for each indicated vector object. As a result, each vector object may have a slightly different fill lightness but within the range as defined by the variation delimiter.

A stroke width variation selector 214 may indicate to the graphics design application that the variation parameter (e.g., property indicator) is the width of the stroke which is to be automatically varied for each vector object indicated (e.g., created by a vector object creation tool and/or one or more selected vector objects post generation). The variation parameter of the variation delimiter associated with the stroke width property indicator may be provided in any suitable manner such as provided by the user and/or retrieved from memory and/or storage. For example, a user may define the variation delimiter for the stroke width variation selector in terms of a maximum percentage of variability based on a selected basis stroke width indicated in the stroke property toolbox for the associated brush component. The example stroke width variation selector 214 of the variations toolbox 200 of FIG. 2 provides a slider which is horizontally movable to indicate the user defined maximum percentage of variability, where a slider to the left indicates 0% variability and the extreme right position indicates a maximum of 100% variability. In this manner, the higher the variability, the more different each vector object's stroke width may be from the basis stroke width. As shown in the example variation toolbox of FIG. 2, the stroke width selector 214 may be displayed proximate a stroke width property indicator 256, which is shown as stroke with arrows indicating the width of the stroke. Although the slider of the stroke width selector is displayed as horizontal, it is to be appreciated that any user interface device(s) in any appropriate orientation may be used.

In response to the stroke width variation selector being activated (e.g., slid to indicate a variability of greater than 0%) and an indication of a stroke from the user, the variation engine may automatically determine the variation value appropriate saturation for each indicated vector object based on the predetermined or user defined variation parameters. The variation to the stroke width property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis stroke width property value to determine the varied stroke width property value of the indicated stroke. This process may be repeated for each indicated vector object. As a result, each vector object may have a slightly different stroke width but within the range as defined by the variation delimiter.

Figure 5:
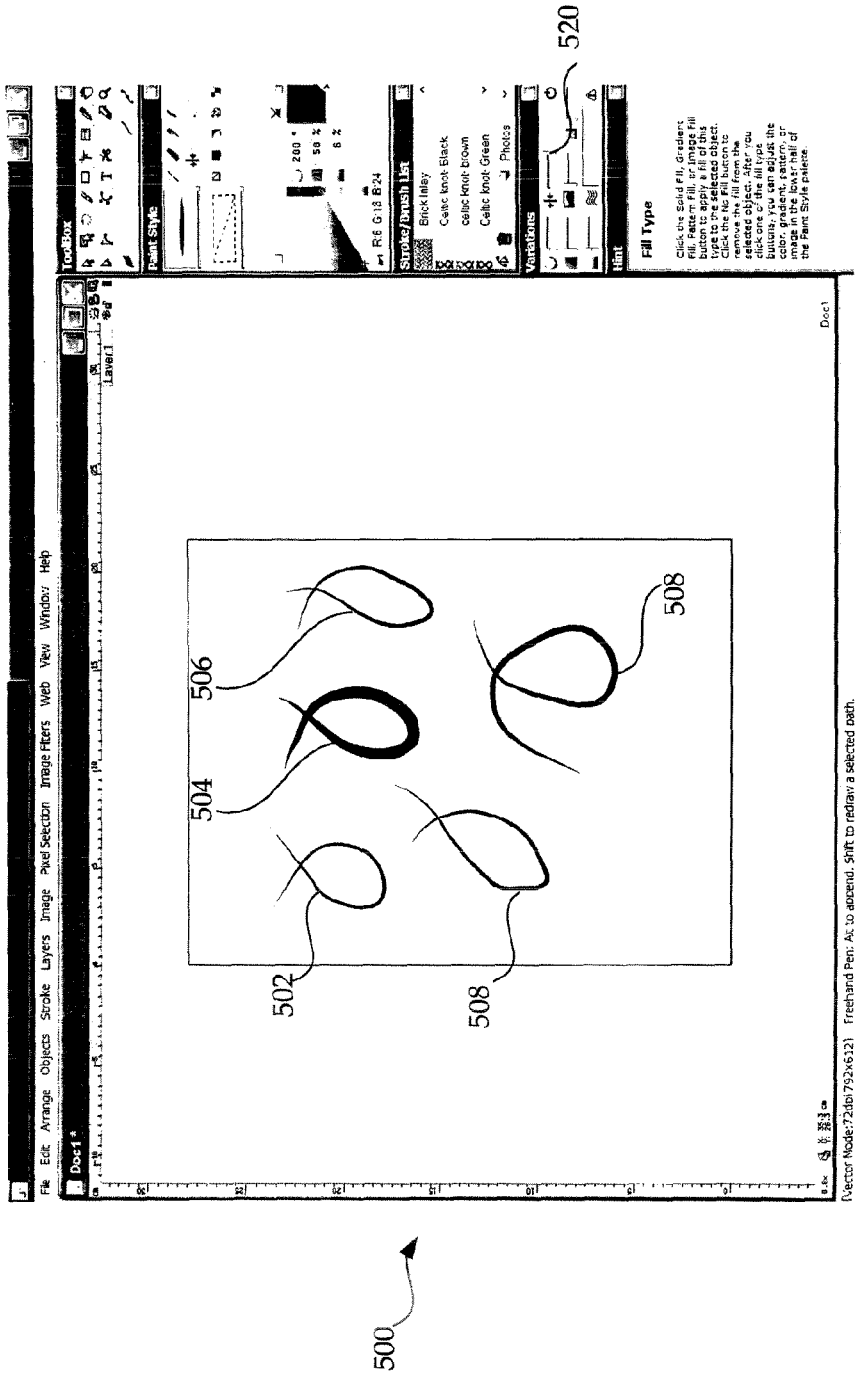
FIG. 5 is an example display of a vector graphics application and stroke width variation.

In a specific example, the vector objects 502, 504, 506, 508, 510, of the example display of FIG. 5 may be drawn with a single brush component with the stroke width variation selector activated and the stroke width delimiter 520 indicating a variation of 100%. In response to each drawn trail indicated by a brush stroke with the brush tool, the stroke width of each stroke is automatically determined based on the variation parameters (e.g., 100% variation) and the basis stroke width (10 points) of the brush component. As a result, the stroke width of vector object 502 was automatically determined to have a narrow stroke width as compared to the automatically determined width of vector object 504. In this manner, the stroke width of each object differs from the stroke of a previous object without the user having to change the stroke width property each time a stroke is drawn.

A variable stroke width variation selector 216 may indicate to the graphics design application that the variation parameter (e.g., property indicator) is the variation of the width of the stroke along the length of the trail. Specifically, a stroke may have a variable width along the length of the trail which is determined through any appropriate algorithm, such as a continuous noise function such as a Perlin noise function, a frequency limited random Fourier series (e.g., combination of sine and/or cosine waves of different frequencies, scales and/or phases, etc.). The variability of the stroke width variation, e.g., variation of the frequency, scale and/or phase in the sinusoidal function, may be automatically changed with the variable stroke width selector and automatically varied for each vector object indicated (e.g., created by a vector object creation tool and/or one or more selected vector objects post generation). The variation parameter of the variation delimiter associated with the variable stroke width variation property indicator may be provided in any suitable manner such as provided by the user and/or retrieved from memory and/or storage.

For example, a user may define the variation delimiter for the variable stroke width variation selector in terms of percentage of variability based on a selected basis variable stroke width indicated in the stroke property toolbox for the associated vector object creation tool. The example variable stroke width variation selector 216 of the variations toolbox 200 of FIG. 2 provides a slider which is horizontally movable to indicate the user defined percentage of variability, where a slider to the left indicates 0% variability and the extreme right position indicates a maximum of 100% variability. In this manner, the higher the variability, the more different each variability of the vector object's stroke width may be from the basis stroke width variability. As shown in the example variation toolbox of FIG. 2, the variable stroke width variation selector 216 may be displayed proximate a variable stroke width property indicator 258, which is shown as a stroke portion having variable width. Although the slider of the variable stroke width variation selector is displayed as horizontal, it is to be appreciated that any user interface device(s) in any appropriate orientation may be used.

In response to the variable stroke width variation selector being activated (e.g., slid to indicate a variability of greater than 0%) and an indication of a stroke from the user, the variation engine may automatically determine the variation value appropriate variability (e.g., frequency, scale, phase change) for each indicated vector object based on the predetermined or user defined variation parameters. The variation to the variable stroke width variation property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis variable stroke width property value (e.g., frequency, scale, phase change) to determine the varied variable stroke width property value of the indicated stroke. This process may be repeated for each indicated vector object. As a result, each vector object may have a slightly different stroke width variability but within the range as defined by the variation delimiter.

Figure 6:
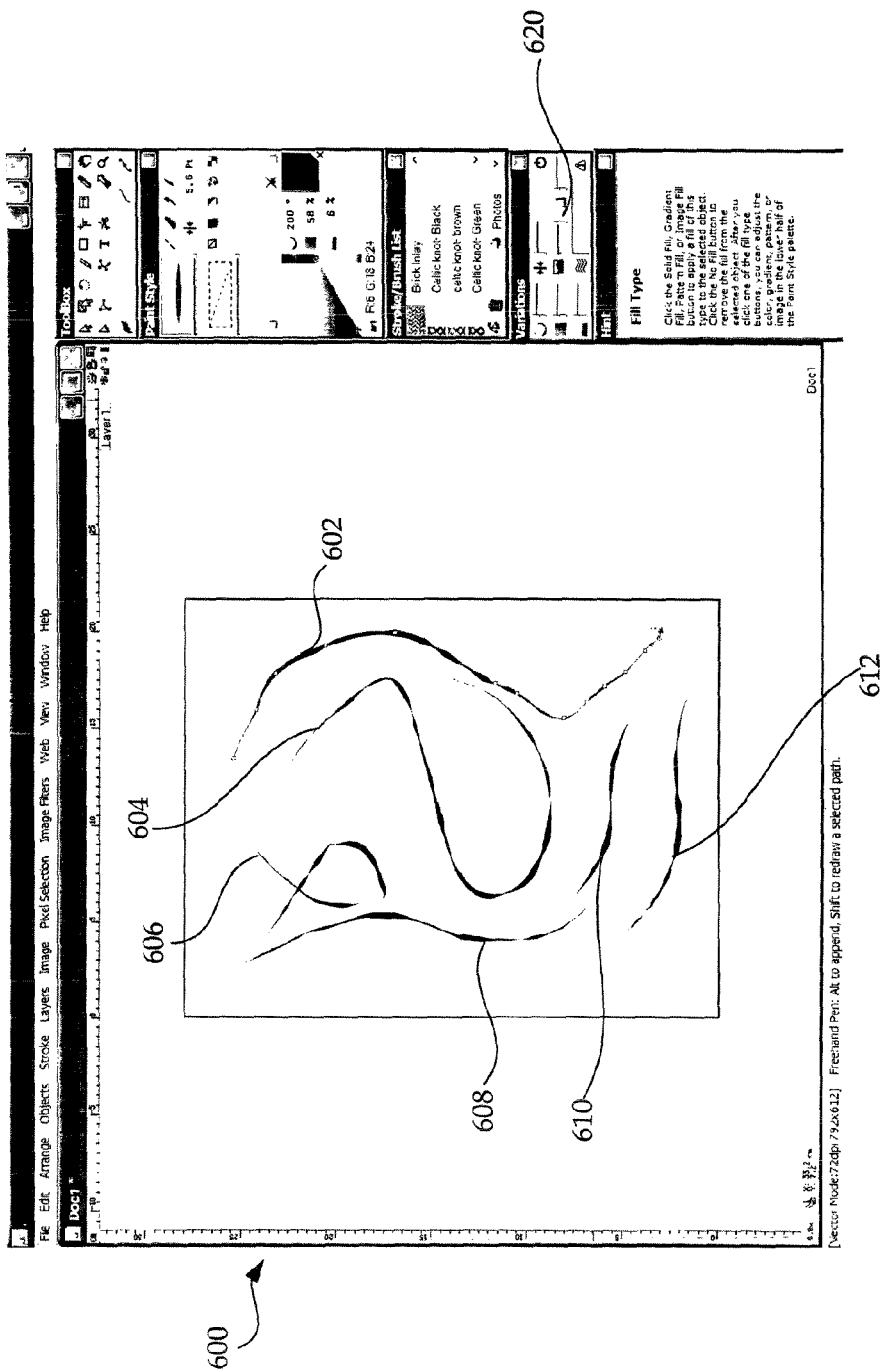
FIG. 6 is an example display of a vector graphics application and variable stroke width variation.

In a specific example, the vector objects 602, 604, 606, 608, 610, 612, of the example display of FIG. 6 may be drawn with a single brush component with the variable stroke width variation selector activated and the stroke width delimiter 620 indicating a variation of 100%. In response to each drawn trail indicated by a brush stroke with the brush tool, the stroke width variability of each stroke is automatically determined based on the variation parameters (e.g., 100% variation) and the basis stroke width variability of the brush component. As a result, the stroke width variability of vector object 606 was automatically determined to have a fairly high frequency change of stroke width variability as compared to the automatically determined variable width of vector object 610. In this manner, the stroke width variability of each object differs from the stroke of a previous object without the user having to change the stroke width variability property each time a stroke is drawn.

A brush type variation selector 218 may indicate to the graphics design application that the variation parameter (e.g., property indicator) is the type of brush which is to be automatically varied for each vector object indicated (e.g., created by a vector object creation tool and/or one or more selected vector objects post generation). The variation parameter of the variation delimiter associated with the brush type property indicator may be provided in any suitable manner such as provided by the user and/or retrieved from memory and/or storage. For example, a user may define the variation delimiter for the brush type variation selector in terms of a group of one or more discrete brush types. For example, a group of brush types may be individually listed and/or a predetermined group of brushes (e.g., watercolor, oils, acrylic, design element, dry medium graphics, ink, palette, pointers, photos, variable shape, and the like) may be indicated with a predetermined or user defined group name. The example brush type variation selector 218 of the variations toolbox 200 of FIG. 2 provides a text box and a drop down menu (not shown) allowing a user to input a brush type group name. In this manner, the higher the number of brushes in the defined group, the more different each vector object's brush type may be. As shown in the example variation toolbox of FIG. 2, the brush type variation selector 218 may be displayed proximate a brush type indicator 258, which is shown as a bristle brush stroke portion. In one example, the variation delimiter may additionally include a repetition indicator which indicates the frequency of repetition of brush types in the indicated group.

In response to the brush type variation selector being activated (e.g., one or more brush types indicated) and an indication of a stroke from the user, the variation engine may automatically determine the variation value (e.g., brush type) for each indicated vector object based on the predetermined or user defined variation parameters. The variation to the brush type property may be determined in any suitable manner. For example, the variation engine may select a brush type from the defined group of brush types such as random or ordered selection from the group. The selection of the variation value from the group may also be limited based on the variation parameters including a repetition indicator (e.g., no repeats until all brush type used, repetition allowed, repetition no more than two times in a row, etc.). The determined variation value (i.e., brush type) may be applied to the indicated stroke. This process may be repeated for each indicated vector object. As a result, each vector object may have a slightly different brush type but within the range as defined by the variation delimiter.

Figure 7:
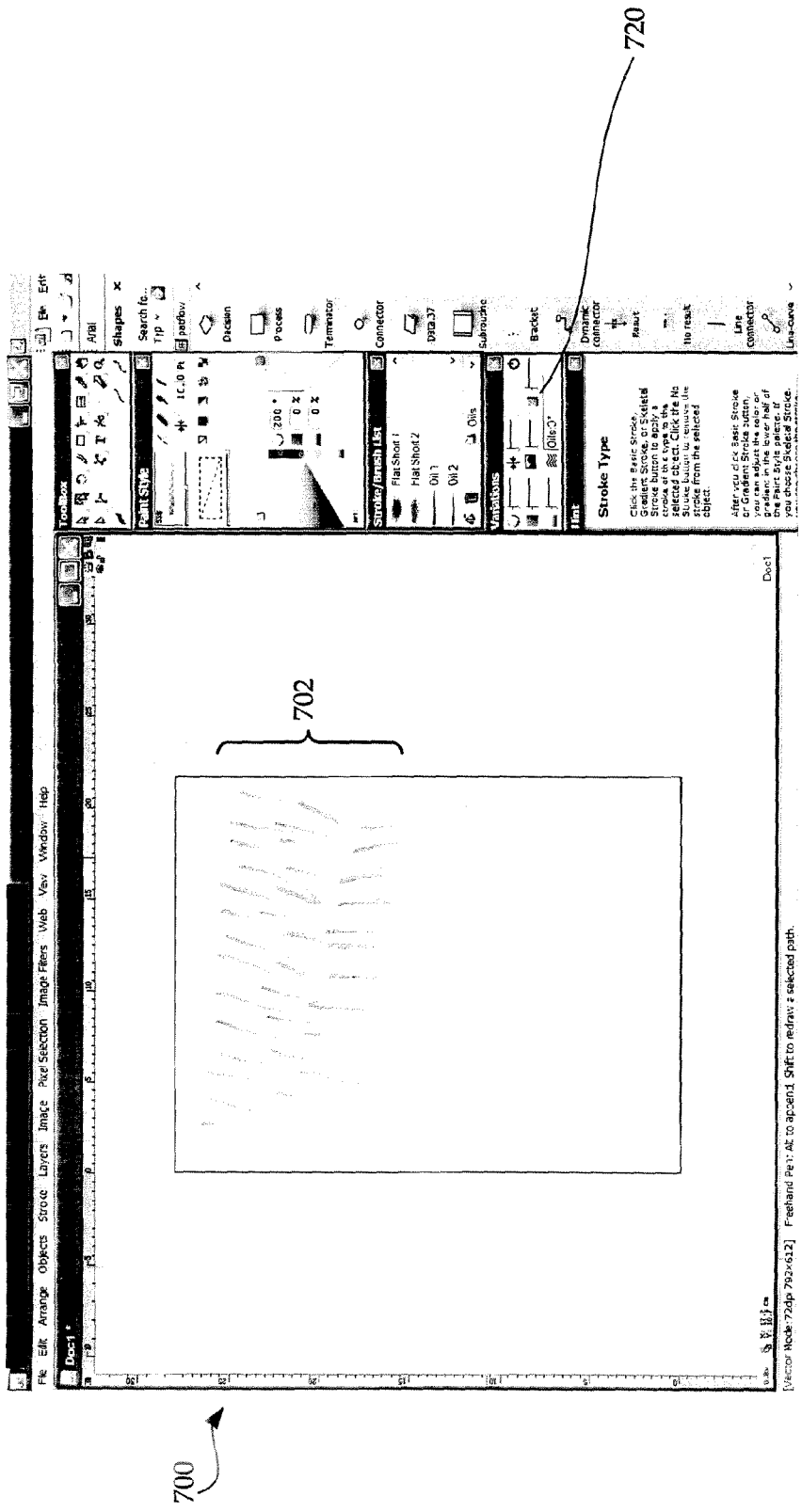
FIG. 7 is an example display of a vector graphics application and brush type variation.

In a specific example, the vector objects 702 of the example display 700 of FIG. 7 may be drawn with a single brush component with the brush type variation selector activated and the brush type delimiter 720 indicating a variation within the group of oil type brushes. In response to each drawn trail indicated by a brush stroke with the brush tool, the brush type of each stroke is automatically determined based on the variation parameters (e.g., one of the oil brush types). In this manner, the brush type of each object differs from the stroke of a previous object without the user having to change the brush type each time a stroke is drawn.

The stroke opacity variation selector 220 may indicate to the graphics design application that the variation parameter (e.g., property indicator) is the opacity of the stroke which is to be automatically varied for each vector object indicated (e.g., created by a vector object creation tool and/or one or more selected vector objects post generation). The variation parameter of the variation delimiter associated with the stroke opacity property indicator may be provided in any suitable manner such as provided by the user and/or retrieved from memory and/or storage. For example, a user may define the variation delimiter for the stroke opacity variation selector in terms of a maximum percentage of variability based on a selected basis stroke opacity, such as that indicated in the brush component tool box for the associated vector object. The example stroke opacity variation selector 220 of the variations toolbox 200 of FIG. 2 provides a slider which is horizontally movable to indicate the user defined percentage of variability, where a slider to the left indicates 0% variability and the extreme right position indicates a maximum of 100% variability. In this manner, the higher the variability, the more different each vector object's stroke opacity may be from the basis stroke opacity.

In response to the stroke opacity variation selector being activated (e.g., slid to indicate a variability of greater than 0%) and an indication of a stroke from the user, the variation engine may automatically determine the variation value appropriate opacity for each indicated stroke based on the predetermined or user defined variation parameters. The variation to the stroke opacity property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis opacity property value to determine the varied property value of the indicated stroke. This process may be repeated for each indicated vector object. As a result, each stroke may have a slightly different opacity but within the range as defined by the variation delimiter.

Figure 8:
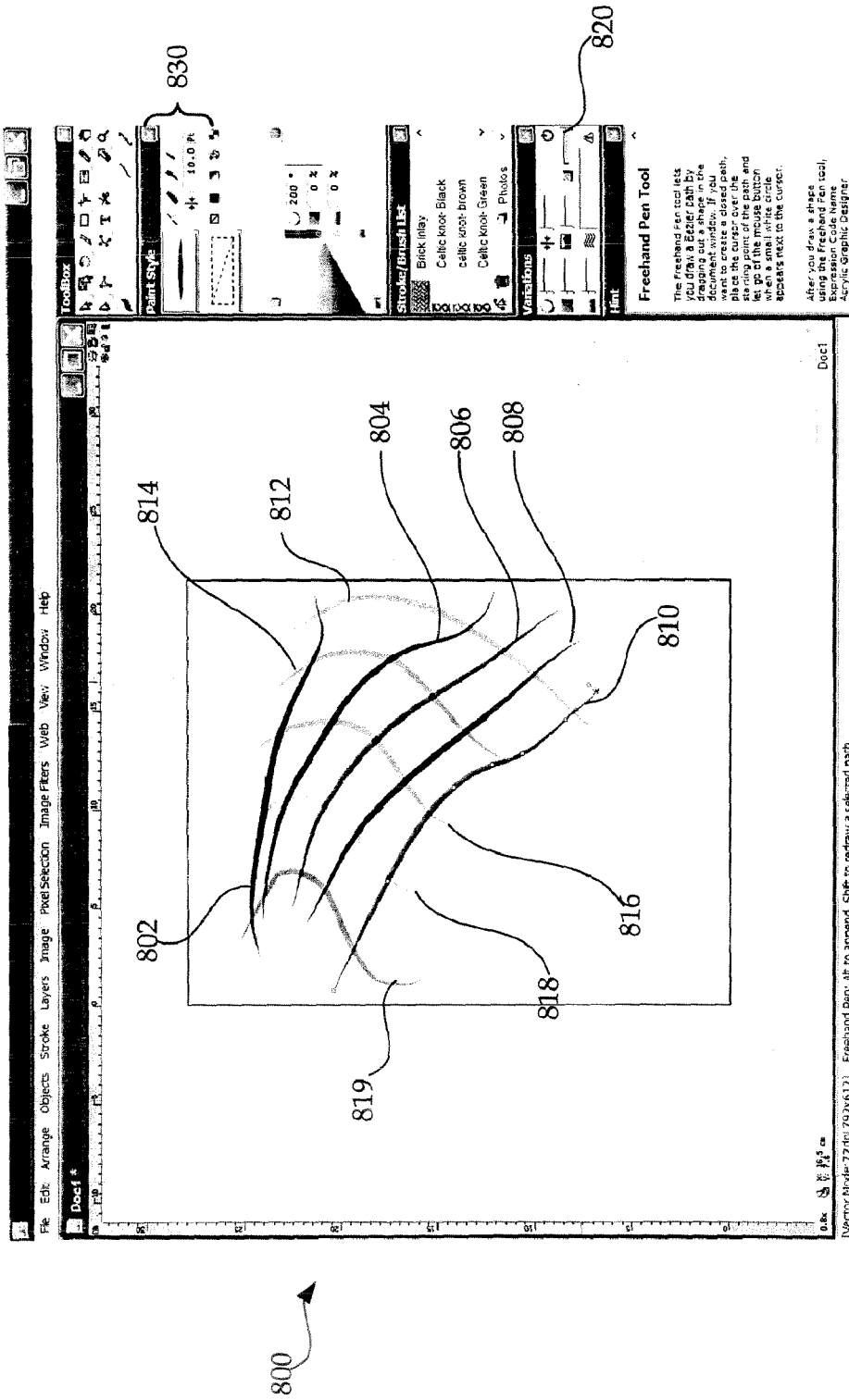
FIG. 8 is an example display of a vector graphics application and stroke opacity variation.

In a specific example, the vector objects 802, 804, 806, 808, 810, 812, 814, 816, 818, 819, of the example display 800 of FIG. 8 may be drawn with a single brush component with the stroke opacity variation selector activated and the stroke opacity delimiter 820 indicating a maximum variation of 100%. In response to each drawn trail indicated by a brush stroke with the brush tool, the stroke opacity of each stroke is automatically determined based on the variation parameters (e.g., 100% variation) and the basis stroke opacity of the brush component shown in the brush component toolbox 830. As a result, the opacity of vector object 802 was automatically determined to have a fairly high opacity as compared to the automatically determined variable opacity of vector object 806. In this manner, the opacity of each object differs from the stroke of a previous object without the user having to change the stroke opacity property each time a stroke is drawn.

In a similar manner, the fill opacity variation selector 222 may indicate to the graphics design application that the variation parameter (e.g., property indicator) is the opacity of the fill which is to be automatically varied for each vector object indicated (e.g., created by a brush component and/or one or more selected vector objects post generation). The variation parameter of the variation delimiter associated with the fill opacity property indicator may be provided in any suitable manner such as provided by the user and/or retrieved from memory and/or storage. For example, a user may define the variation delimiter for the fill opacity variation selector in terms of a maximum percentage of variability based on a selected basis fill opacity in the brush component palette for the associated vector object. The example fill opacity variation selector 222 of the variations toolbox 200 of FIG. 2 provides a slider which is horizontally movable to indicate the user defined percentage of variability, where a slider to the left indicates 0% variability and the extreme right position indicates a maximum of 100% variability. In this manner, the higher the variability, the more different each vector object's fill opacity may be from the basis fill opacity.

As shown in the example variation toolbox of FIG. 2, the stroke opacity selector 220 and the fill opacity selector 222 may be displayed proximate each other. The general property, e.g., opacity, may be indicated to the user with a opacity property indicator 260, which is shown as a gray block. Proximate placement of the stroke opacity selector and the fill opacity selector to a single opacity property indicator may provide a compact display of tools for the user. Moreover, a user may be provided with controls which allow the stroke opacity selector to be independently moved relative to the fill opacity selector. Additionally or alternatively, the user may be provided with a user interface device which allows both the stroke and fill opacity selectors to be moved together if the user wishes for both properties to be varied identically. For example, the stroke slider and the fill slider user interface devices may be moved independently of each other or together. For example, a single click and drag may move a single selector, and a double click and drag may move both selectors, even if only one selector is beneath the user input device indicator (e.g., mouse icon, stylus, etc.). Although the sliders of the stroke opacity selector and the fill opacity selector are displayed as horizontal with the stroke selector on top, it is to be appreciated that any user interface device(s) in any appropriate orientation may be used.

In response to the fill opacity variation selector being activated (e.g., slid to indicate a variability of greater than 0%) and an indication of a stroke from the user, the variation engine may automatically determine the variation value appropriate fill opacity for each indicated vector object based on the predetermined or user defined variation parameters. The variation to the fill opacity property may be determined in any suitable manner. For example, the variation engine may determine the variation value for a first indicated stroke by selecting a random number between negative one and positive one and multiplying the random number by the upper range indicated by the variation delimiter. The determined variation value may be applied (such as added or multiplied) to the basis fill opacity property value to determine the varied fill property value of the indicated stroke. This process may be repeated for each indicated vector object. As a result, each vector object may have a slightly different fill opacity but within the range as defined by the variation delimiter.

Figure 9:
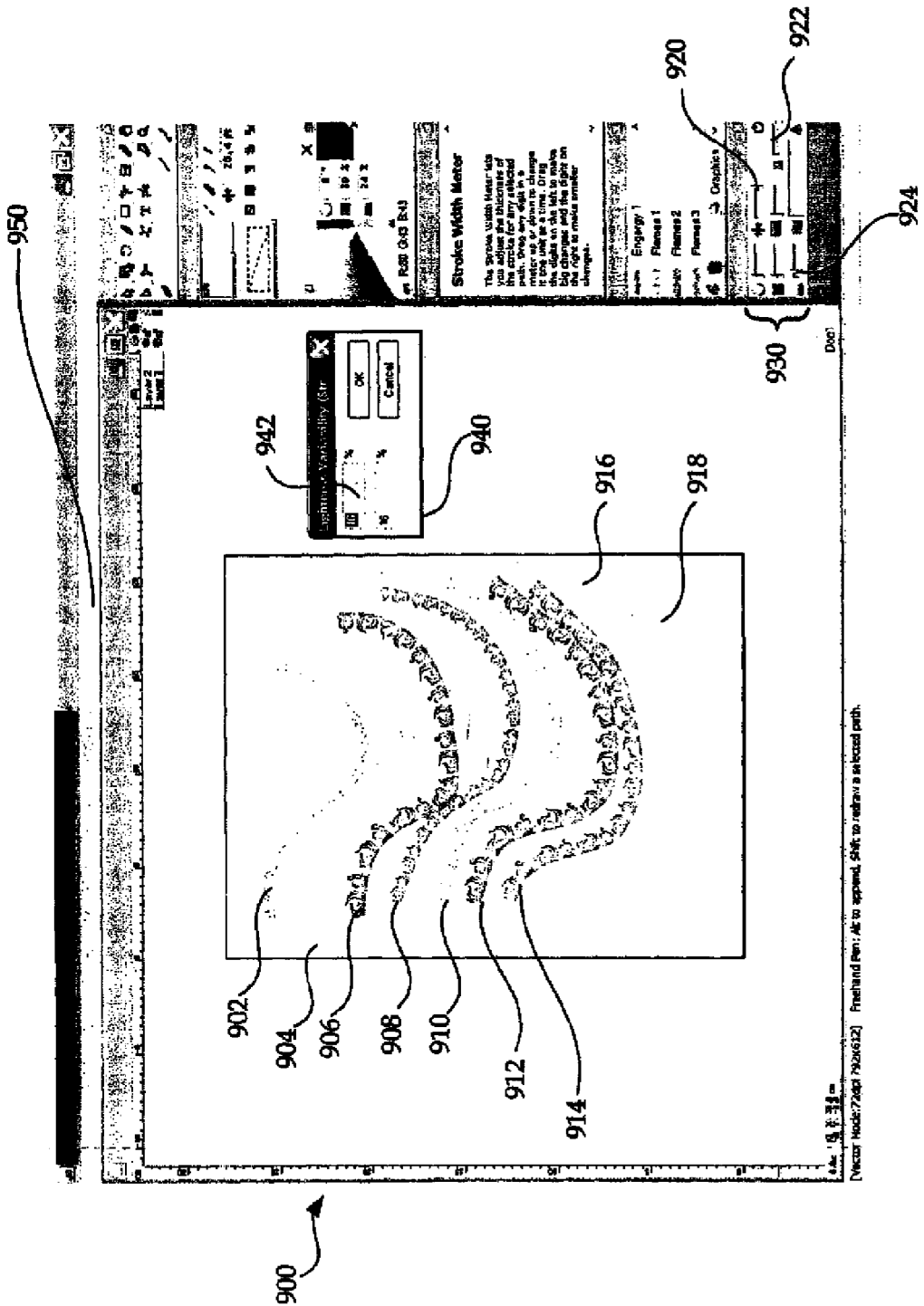
FIG. 9 is an example display of a vector graphics application with multiple property variations.

Although each of the above examples illustrates variation of a single property value of a plurality of vector object, it is to be appreciated that a plurality of properties may be varied for each indicated vector object. For example, the example display 900 of FIG. 9 illustrates vector objects 902, 904, 906, 908, 910, 912, 914 with variable stroke width as indicated by the variable width selector 920, variable stroke opacity as indicated by the stroke opacity selector 922, and variable lightness as indicated by the variable lightness selector 924. In the examples of FIG. 4-8, the variation delimiters and property indicators were displayed through a variation toolbox such as variation toolbox 930. It is to be appreciated that additional and/or alternative user interface devices may be provided. For example, a property variation dialog box may be provided allowing a user to indicate the variation delimiter for the indicated property. For example, as shown in FIG. 9, a lightness property dialog box 940 is displayed. The displayed dialog box may have the same or different user interface devices as indicated in the toolbox. For example, the variation toolbox stroke lightness selector 924 is a slider and the property (lightness) is indicated with a lightness property icon, whereas in the dialog box, the stroke lightness may be defined through a text box 942. The additional or alternative user interface devices may be accessed in any suitable manner. For example, to activate the additional user interface device, a pull down menu may be available under the stroke menu item 950, double clicking the user interface device in the variations toolbox 930 may pull up a dialog box, and the like.

The variation of the property value(s) may be applied to one or more vector objects as each vector object is generated (e.g., drawn) by a vector object creation tool, or may be applied to one or more existing vector objects post-generation. In the latter example, one or more vector objects may be selected and the variation(s) to be applied may be indicated through the appropriate user interface device such as a variations toolbox, and applied to each selected vector object.

The variation to a property may be stored associated with the vector object in any suitable manner. In one example, the variation delimiters may be stored associated with the property attribute (e.g., property indicator) of the vector based object. FIG. 10 illustrates an example data store 1000 for storing vector based object information. In the example data store 1000, a vector object identifier 1002 may be associated with information defining the vector object which may be generally indicated as the vector object's coordinate frame 1004, vector object attributes 1006, list of applied filters 1008, and deformation data 1010. If is to be appreciated that although vector object data store 1000 illustrates coordinate frame information object attributes, applied filters, and deformation data, it is to be appreciated that additional and/or alternative vector object information may be stored in the vector object data store to define the vector object.

Figure 11:
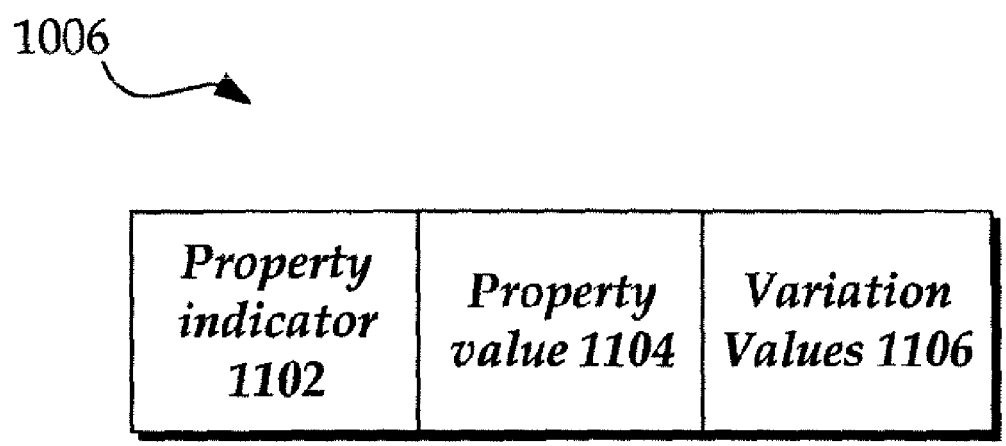
FIG. 11 is a table of an example vector object attribute data store.

The vector object attributes 1006 may be indicated in any suitable manner such as a pairing of a property indicator with a property value, where in some cases the property indicator may be a particular order of the listing of the property value. An example attribute data store for the vector object attributes 1006 of FIG. 10 is illustrated in FIG. 11. In this example, a property indicator 1102 is associated with a property value 1104. For example, if the property indicator 1102 indicated a stroke hue property, the property value 1004 may include one or more values indicating the basis hue of the brush component, such as the mixture of red, green and blue, and the like. If a variation is applied to a property of a vector object, the determined variation value may be applied and incorporated directly into the stored property value. Specifically, the stored property value 1104 may be replaced with the varied property value as determined by the variation engine. In another example, as shown in FIG. 1, the property indicator 1102 and the basis property value 1104 may be associated with a variation value 1106 which may indicate the one or more variation parameters of the variation and/or the actual determined variation value based on the variation parameters. For example, the variation value 1106 may contain a random number generated by the variation engine as well as the variation parameters, such as the variation delimiter such as a minimum and/or maximum range value, percentage, and the like. In this manner, the basis property value, the random number, and/or the variation delimiter values may be changed independently. Specifically, a user may change the basis property value, such as increase the width of the basis stroke, and in response, the vector object may be automatically re-rendered with the stored random number and/or variation delimiters applied to the new basis width value. In another example, the user may modify the variation delimiter, e.g., extend or limit the percentage of variability, and in response, the vector object may be re-rendered with the random number and new variation delimiter applied to the existing basis property value.

It is to be appreciated that any suitable data store in any suitable format may be used to store and/or communicate the vector object information including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computing device.

Figure 3:
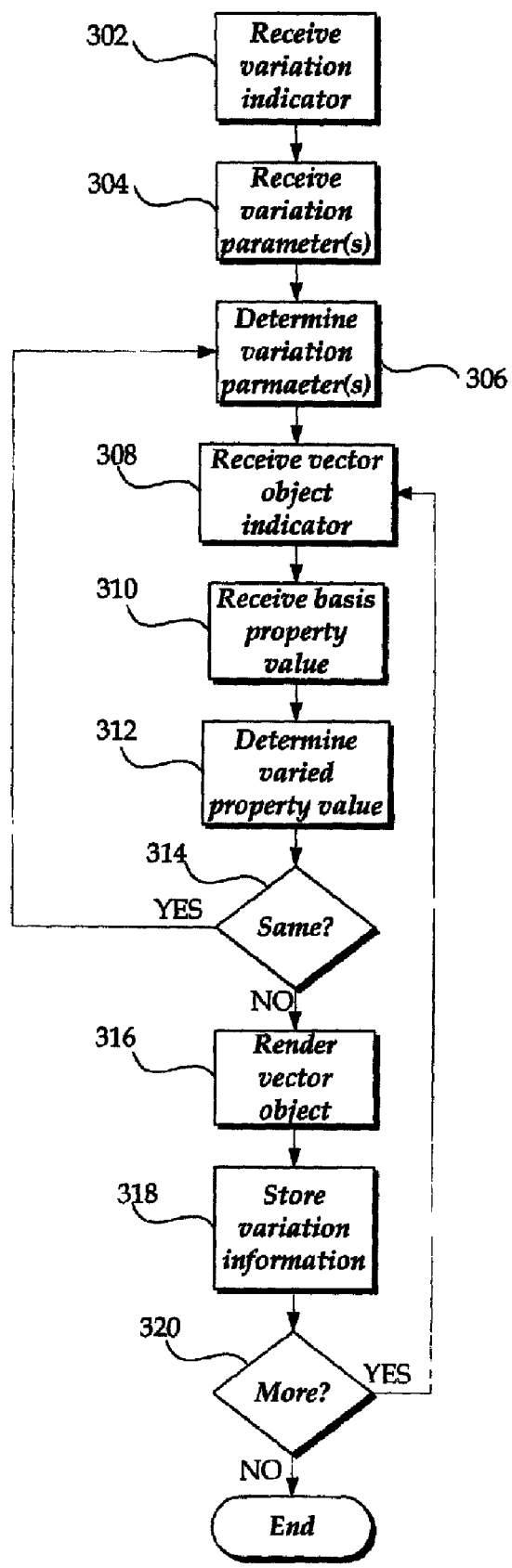
FIG. 3 is a flow chart of an example method of applying a variation to a property of one or more vector objects.

FIG. 3 illustrates an example method of applying a variation to a property of one or more vector objects. A variation indicator indicating the type of variation method to be applied may be received 302 by the graphics design application. The variation indicator may be received in any suitable manner, such as through a user defined input or retrieved from memory such as a default value. The variation method may be any suitable algorithm such as a randomness variation, a sequential variation, and the like.

One or more variation parameters may be received 304. As noted above, the variation parameters may include a variation property indicator indicating the property to be varied, such as stroke/fill hue, stroke/fill lightness, stroke width, stroke width variability, and the like. The variation parameters may also include an indication of the variation delimiter which indicates the limits or bounds on the identified variation property, such as a range, a bound of a range, percentage, family or group of selectable properties, and the like. Indication of the variation parameters for a particular property may automatically provide the variation property indicator. For example, increasing the variation delimiter from 0% to some value greater than 0% may automatically provide the property indicator for the associated property. The variation parameters may be received in any suitable manner such as retrieved from memory and/or storage of an existing vector object, retrieved from memory and/or storage of a default variation parameter store, determined from manipulation of a displayed user interface device with a user input device, and the like.

In response to the variation property indicator and the variation type indicator, the graphics design application may automatically determine 306 one or more variation parameters. For example, if the variation to be applied is a random variability, the graphics design application such as through the variation engine may determine a random number in any suitable manner.

The graphics design application may receive 308 an indication of one or more vector objects. The indication of a vector object may be any suitable indication such as selection of one or more existing vector objects or an indication of a pen down event with a vector object creation tool and pen movement.

The graphics design application may receive 310 a basis property value of a vector object. The basis property value of interest is the basis property value associated with the property indicator identified in the variation parameters. The basis property value may be received in any suitable manner such as retrieved from memory and/or storage of an existing vector object, retrieved from memory and/or storage of a default basis property value store, determined from manipulation of a displayed user interface device with a user input device, and the like. For example, in response to receiving the property indicator, the graphics design application may determine the basis property value for the associated property to be varied. The basis property value may be stored as a part of an existing and selected vector object and/or may be determined from user indication of a vector object creation tool.

Based on the variation indicator and the variation parameters, the varied property value may be determined 312 by the graphics design application, such as by the variation engine. For example, the variation engine may determine the variation to the indicated property in any suitable manner. For example, a determined variation parameter such as a random number from the range of negative one to positive one may be multiplied by a variation delimiter, such as a percentage. The variation may then be applied to the vector object such as by adding the variation to the basis property value. In some cases, a basis property value may not be used in determining the varied property value. For example, if the variation delimiter indicates that the variation is to select from a group of existing property values (e.g., brush types), then the basis property value may not be relevant since the selected property value is the varied property value.

In some cases, the graphics design application may compare 314 the determined variation property value with prior determined varied property values of prior vector objects. If the properties are the same or sufficiently similar, the graphics design application may re-determine 308 a variation parameter such that the varied property value is sufficiently different. Sufficiency of a difference in varied property values may be provided by the user of retrieved from a default store. For example, a user may indicate that each vector object must be at least some percentage different from prior vector objects, that varied properties may only be repeated if all other options for selection have been selected, and the like.

If the determined varied property is sufficiently different, the vector object may be rendered 316 for display with the newly determined varied property. The varied property information may be stored 318 in any suitable manner in memory and/or storage such as the data store 122 of FIG. 2. The variation information to be stored may be any suitable information. For example, the determined varied property may be stored as the vector object property value in the associated attribute storage of the vector object. In another example, the property variation determined 312 may be stored associated with the vector object in addition to a basis property value. In another example, the variation parameters and/or variation indicator may be stored associated with the vector object.

The method may end or return to receiving 308 a vector object indication. For example, if a user has selected multiple vector objects to be varied, the graphics application may sequence through and vary the indicated property of each selected vector object. In another example, a user may continue to use a vector object creation tool to create multiple vector objects. In either case, multiple vector objects may be rendered to have a variable property as compared to each other without the user manually changing the property value.

While the many embodiments of the invention have been illustrated and described, it will be appreciated that various changes can be made therein without departing from the spirit and scope of the invention. For example, although many of the variation delimiters discussed above indicate a range of appropriate values, it is to be appreciated that a range may be indicated and/or a group of specific values may be indicated and the property value of the vector object selected from the group. For example, a list of un-related or related discrete values of the property, such as color, hue, saturation, stroke type, may be listed, and the property value of the object may be selected from the group. In one example, a group may be identified as a hue group of red, white, and blue, and every stroke may then have a hue of red, white or blue. In another example, while the example above describes applying a variation to an entire vector object, it is to be appreciated that the variation may be applied to a portion of a vector object. Moreover, the variation may change for different portions of the same vector object. For example, the property to be varied may vary along the length of a stroke as measured from a pen down point or any other suitable starting point such as a vertex or end point of a graphic (e.g., corner of a rectangle, point of a star, etc.). The variation along the length of the vector object may be determined nay any suitable manner. For example the frequency or length of each portion for each separate variation may be determined from a variation parameter, may be the same or may vary itself as multiple variations are made to a property along the length of a vector object. The transitions between points of differing property values may be determined in any suitable manner such as allowing singular changes in the property value or providing a transition length where the transition between different varied property values are smoothed. Any suitable smoothing function may be used to transition one varied property value to another along a length of a vector object. For example a user may indicate that a vector object's stroke opacity is to vary along the length of the stroke. The variation parameters may include the variation delimiters discussed above such as range, percentage and the like to limit the variation. The variation parameter may also include a frequency of variation indicating the frequency that the varied opacity is to change along the length which may be constant, changing, or even random portions of the stroke. The graphics design application may then determine the varied opacity value for each portion of the stroke, and may provide a smooth transition between each or selected portions of the stroke.

The invention claimed is:

1. A system comprising:
   a) a data store configured to store vector object information;
   b) a memory configured to store machine instructions of a graphics design application;
   c) a display configured to display graphics design information;
   d) a user input device configured to interact with the display; and
   e) one or more processors coupled to the memory, the one or more processors being configured to execute the machine instructions of the graphics design application, and the machine instructions being configured to, when executed, cause the one or more processors to perform:
      i) displaying a first variation selector associated with a first property of a vector object;
      ii) displaying a second variation selector associated with a second property of the vector object;
      iii) receiving an indication from the user input device to move the first variation selector;
      iv) automatically moving the second variation selector in correspondence with movement of the first variation selector, based on the indication from the user input device to move the first variation selector;
      v) determining a first variation parameter based on the movement of the first variation selector, wherein the first variation parameter identifies a maximum percentage of variation of the first property from a user-defined basis property value for the first property;
      vi) determining a second variation parameter based on the automatic moving of the second variation selector; and
      vii) automatically determining a varied first property value for the first property of the vector object based at least in part on the first variation parameter, wherein automatically determining the varied first property value comprises generating a random value and adding a multiplication of the random value by the maximum percentage of variation identified by the first variation parameter to the user-defined basis property value, and automatically determining a varied second property value for the second property based at least in part on the second variation parameter,
      wherein the first variation selector and the second variation selector are distinct from an input used to draw the vector object.

2. The system of claim 1, wherein the random value is a number between negative one and positive one.

3. The system of claim 1, wherein the machine instructions are further configured to cause the one or more processors to perform:
   automatically determining a varied third property value by comparing the varied first property value with a previously varied first property value, determining that the varied first property value and the previously varied first property value are the same, and determining the varied third property as a different value than the varied first property value.

4. The system of claim 1, wherein the first variation selector comprises a first moveable slider and the second variation selector comprises a second moveable slider.

5. The system of claim 4, wherein the first moveable slider and the second moveable slider are moveable horizontally.

6. The system of claim 5, wherein automatically moving the second variation selector comprises moving the second moveable slider concurrently with the first moveable slider and in the same horizontal direction as the first moveable slider.

7. A method comprising:
   displaying a first variation selector associated with a first property of a vector object;
   displaying a second variation selector associated with a second property of the vector object;
   receiving a user input to move the first variation selector;
   automatically moving the second variation selector in correspondence with movement of the first variation selector based on the user input to move the first variation selector;
   determining a first variation parameter based on the movement of the first variation selector, wherein the first variation parameter identifies a maximum percentage of variation of the first property from a user-defined basis property value for the first property;
   determining a second variation parameter based on the automatic moving of the second variation selector; and
   automatically determining a varied first property value for the first property of the vector object based at least in part on the first variation parameter, wherein automatically determining the varied first property value comprises generating a random value and adding a multiplication of the random value by the maximum percentage of variation identified by the first variation parameter to the user-defined basis property value, and automatically determining a varied second property value for the second property based at least in part on the second variation parameter,
   wherein the first variation selector and the second variation selector are distinct from an input used to draw the vector object, and
   wherein at least automatically determining the varied first property value is performed by one or more computers.

8. The method of claim 7, wherein the random value is a number between negative one and positive one.

9. The method of claim 7, further comprising:
   automatically determining a varied third property value by comparing the varied first property value with a previously varied first property value, determining that the varied first property value and the previously varied first property value are the same, and determining the varied third property as a different value than the varied first property value.

10. The method of claim 7, wherein the first variation selector comprises a first moveable slider and the second variation selector comprises a second moveable slider.

11. The method of claim 10, wherein the first moveable slider and the second moveable slider are moveable horizontally.

12. The method of claim 11, wherein automatically moving the second variation selector comprises moving the second moveable slider concurrently with the first moveable slider and in the same horizontal direction as the first moveable slider.

13. One or more computer-readable storage devices storing computer-readable instructions which, when executed by one or more processing devices, cause the one or more processing devices to perform:

displaying a first variation selector associated with a first property of a vector object;

displaying a second variation selector associated with a second property of the vector object;

receiving a user input to move the first variation selector;

automatically moving the second variation selector in correspondence with movement of the first variation selector based on the user input to move the first variation selector;

determining a first variation parameter based on the movement of the first variation selector, wherein the first variation parameter identifies a maximum percentage of variation of the first property from a user-defined basis property value for the first property;

determining a second variation parameter based on the automatic moving of the second variation selector; and automatically determining a varied first property value for the first property of the vector object based at least in part on the first variation parameter, wherein automatically determining the varied first property value comprises generating a random value and adding a multiplication of the random value by the maximum percentage of variation identified by the first variation parameter to the user-defined basis property value, and automatically determining a varied second property value for the second property based at least in part on the second variation parameter, wherein the first variation selector and the second variation selector are distinct from an input used to draw the vector object, and wherein at least automatically determining the varied first property value is performed by one or more computers.

14. The one or more computer-readable storage devices of claim 13, wherein the random value is a number between negative one and positive one.

15. The one or more computer-readable storage devices of claim 13, further comprising instructions which, when executed by the one or more processing devices, cause the one or more processing devices to perform:

automatically determining a varied third property value by comparing the varied first property value with a previously varied first property value, determining that the varied first property value and the previously varied first property value are the same, and determining the varied third property as a different value than the varied first property value.

16. The one or more computer-readable storage devices of claim 13, wherein the first variation selector comprises a first moveable slider and the second variation selector comprises a second moveable slider.

17. The one or more computer-readable storage devices of claim 16, wherein the first moveable slider and the second moveable slider are moveable horizontally.

18. The one or more computer-readable storage devices of claim 17, wherein automatically moving the second variation selector comprises moving the second moveable slider concurrently with the first moveable slider and in the same horizontal direction as the first moveable slider.

* * * * *